Patented June 3, 1952

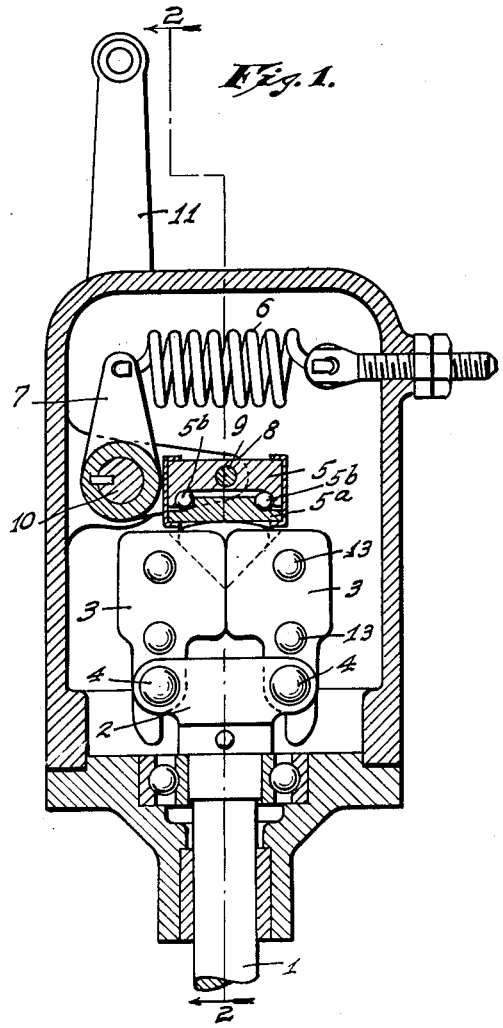
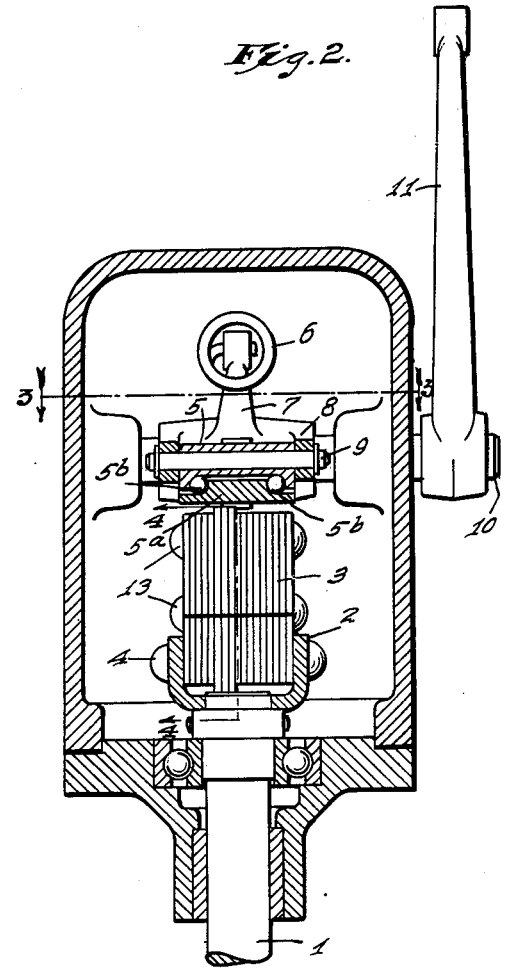
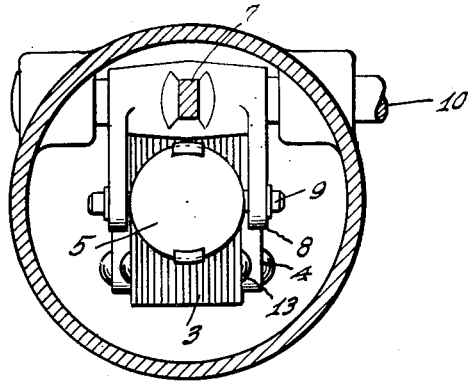
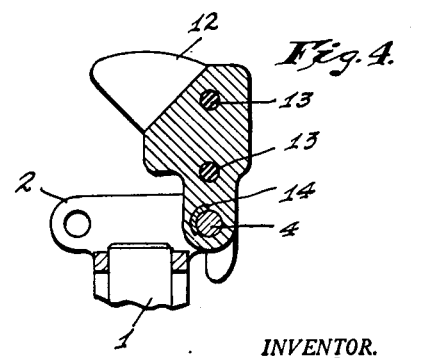
INVENTOR.
LE ROY VALENTINE BRADNICK,
BY
ATTORNEYS.

2,599,157

UNITED STATES PATENT OFFICE 2,599,157

CENTRIFUGAL SPEED RESPONSIVE MECHANISM

Le Roy Valentine Bradnick, Anderson, Ind.

Application April 1, 1947, Serial No. 738,661

4 Claims. (Cl. 264—15)

This invention relates to improvements in speed responsive mechanisms used for various purposes, such as (1) control of throttle valves, and fuel metering and by-pass systems of elastic fluid engines, (2) control of pilot valve plungers of servo-motors in hydraulic governors and boosters, (3) control of electrical switches, and (4) control of other mechanisms limiting or dependent upon rotational speed. The objects of the improvements are: first, to eliminate parts, used in similar mechanisms of current design, required to hold the oscillating thrust bearing in position at the center of rotation of the mechanism; examples of such parts are, (1) sleeves actuated by levers from fly-balls and guided by extensions of drive shafts, (2) sleeves actuated by linkages from fly-balls and guided by extensions of drive shafts, (3) various plungers and pistons actuated by levers from fly-balls and guided by cylinders in shafts, etc.; second, to improve the performance of speed responsive mechanisms by eliminating friction encountered in current designs unless extremely close tolerances are maintained, from fly-balls to thrust bearings; and third, to reduce the cost of manufacture of accurate speed responsive mechanisms by the elimination of some costly parts, by a construction permitting more liberal manufacturing tolerances, and by other means made apparent by the following description relating to the accompanying drawing.

This invention may be made as illustrated in the accompanying drawing, in which Figure 1 is a vertical section of the entire mechanism; Figure 2 is a vertical section of the mechanism taken as indicated at 2—2 on Figure 1; Figure 3 is a horizontal cross section of the mechanism taken as indicated at 3—3 on Figure 2; Figure 4 is a vertical sectional detail view of the fly-ball taken as indicated at 4—4 on Figure 2.

In Figure 1 the drive shaft 1, which has suitable bearings and housing and is driven by the unit under control, is fastened to and drives the fly-ball carrier 2. The fly-balls 3 are fitted to the fly-ball carrier 2 in a manner that permits their angular movement around their respective fly-ball pins 4.

The torque at the fly-ball pins 4, caused by the horizontal rotation of the fly-balls 3, resolves itself into forces transmitted to the bearing member 5, by means of the fly-ball cams 12, Figure 4, which bear on a thrust member 5a rotatably supported from the member 5 through anti-friction bearing elements 5b. These forces are opposed by the adjustable resilient means 6, Figure 1, through the resilient means lever 7, the thrust bearing yoke 8, and the thrust bearing yoke pin 9.

When the horizontal rotation of the fly-balls 3, Figure 1, exceeds a speed determined by the adjustment of the resilient means 6, the fly-balls 3 move outward around the fly-ball pins 4 to an extent determined by the calibration between the fly-balls 3, and the resilient means 6. By means of the fly-ball cams 12, Figure 4, the outward movement of the fly-balls 3, Figure 1, is transformed into linear movement at the thrust bearing 5, which causes an angular movement of the control shaft 10 to which the bearing yoke 8 is fastened. This angular movement is transferred to the mechanism under control by a suitable control lever 11, fastened to the control shaft 10. When the speed of horizontal rotation of the fly-balls 3 is reduced the reverse occurs.

The bearing member 5, Figure 1, is held in position on the axis of the mechanism by the thrust bearing yoke 8, which is fastened to the control shaft 10. The thrust bearing yoke pin 9 permits the axis of the thrust member 5a to remain parallel to the rotating drive shaft 1 of the mechanism as the thrust bearing yoke 8 swings. This system eliminates the necessity for levers from the fly-balls, and a sleeve guided by an extension from the drive shaft, or other arrangements covered in the second paragraph.

Referring to Figure 4, the fly-balls 3 are made of laminations fastened together by rivets 13. A smooth hole for the fly-ball pin 4 is economically provided by the keyed partial bushing 14, extending the width of the fly-ball carrier. Clearance for the cam of the mating fly-ball is accomplished as illustrated in Figure 4.

I claim as my invention:

1. In a speed-responsive mechanism, a rotatable shaft, an arm mounted for swinging movement about a first axis, a thrust member supported from said arm independently of said shaft for swinging movement about a second axis parallel to but spaced from said first axis, said first axis being located in a plane perpendicular to said shaft and spaced therefrom by a distance such that the axis of the shaft will be approximately tangent to the path followed by said second axis as the arm swings about the first axis whereby said thrust member may move for a distance extending generally along said axis, said thrust member having a generally plane thrust-face intersected by the shaft-axis and maintainable generally normal to the shaft-axis by swinging of the thrust member about said second axis as said arm swings about the first axis, fly weights pivotally supported from said shaft for outward swinging movement under the influence of centrifugal force as the shaft rotates, said fly weights having portions engaging the thrust-face of said thrust member to exert an arm-swinging thrust thereon as the fly weights swing outwardly, and yielding means acting on said arm to oppose swinging thereof by the thrust which the fly weights exert on the thrust member.

2. The invention set forth in claim 1 with the addition of a bearing member pivotally mounted on said arm at said second axis, said thrust member being mounted on said bearing member for rotation about an axis perpendicular to said second axis and parallel to the axis of the shaft.

3. The invention set forth in claim 1 with the addition of an anti-friction bearing supporting the thrust member from the bearing member.

4. The invention set forth in claim 1 with the addition that said fly weights have interdigitating portions on which said cam surfaces are provided.

LE ROY VALENTINE BRADNICK.

REFERENCES CITED

The following references are of record in the file of this patent:

UNITED STATES PATENTS

| Number | Name | Date |
|---|---|---|
| 228,566 | Snow | June 8, 1880 |
| 532,849 | Vivian | Jan. 22, 1895 |
| 784,333 | Kroner | Mar. 7, 1905 |
| 1,600,788 | Beall | Sept. 21, 1926 |
| 2,267,919 | Hoof | Dec. 30, 1941 |
| 2,412,289 | Pugh | Dec. 10, 1946 |